L. F. ADT.
MOUNTING FOR SPECTACLES.
APPLICATION FILED APR. 29, 1910.
1,017,642.
Patented Feb. 20, 1912.
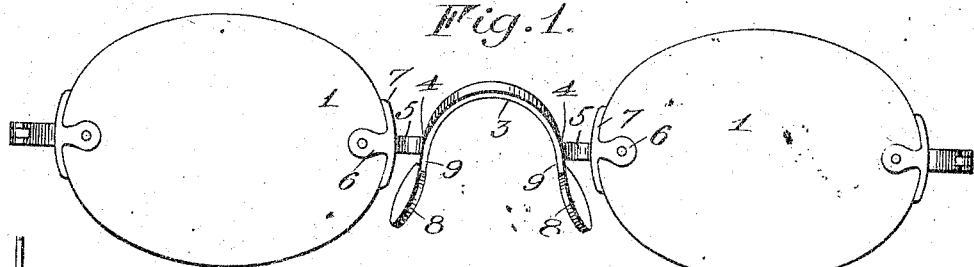
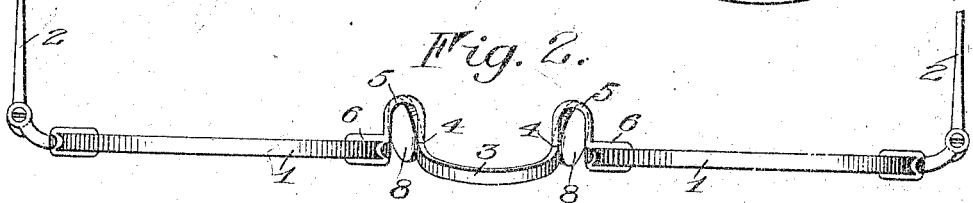
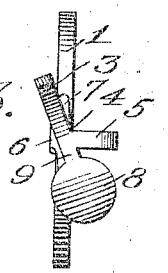
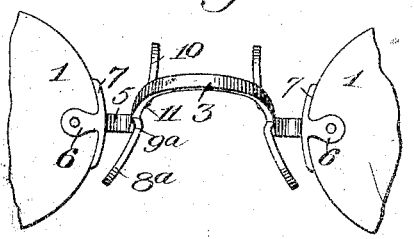
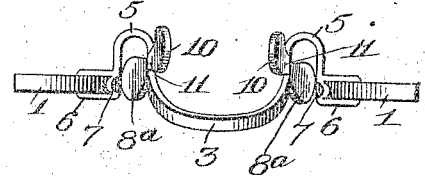
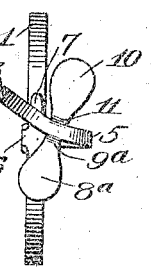
Witnesses
Walter B. Payne.
Inventor
Leo F. Adt
By French & Rich
his Attorneys

UNITED STATES PATENT OFFICE.

LEO F. ADT, OF ALBANY, NEW YORK.

MOUNTING FOR SPECTACLES.

1,017,642.   Specification of Letters Patent.   Patented Feb. 20, 1912.

Application filed April 29, 1910. Serial No. 558,453.

*To all whom it may concern:*

Be it known that I, LEO F. ADT, of Albany, in the county of Albany and State of New York, have invented certain new and useful Improvements in Mountings for Spectacles; and I do hereby declare the following to be a full, clear, and exact description of the same, reference being had to the accompanying drawings, forming a part of this specification, and to the reference-numerals marked thereon.

The present invention relates to mountings for spectacles of the type in which the nose of the wearer is engaged in such a manner that the entire weight of the mounting is not borne by that portion of the nose between the eyes, an object of the invention being to provide rests so located that they bear upon the bony part of the nose and are connected to the mounting in such a manner that they may be faced to conform to the forward and the upward taper of the nose.

To these and other ends the invention consists in certain improvements and combinations of parts all as will be hereinafter more fully described, the novel features being pointed out in the claims at the end of the specification.

In the drawings: Figure 1 is a front view of a mounting constructed in accordance with the present invention; Fig. 2 is a top view of the same mounting; Fig. 3 is a central vertical section of the mounting; Fig. 4 is a front view of another embodiment of the invention; Fig. 5 is a top view of the latter embodiment, and Fig. 6 is a central vertical section thereof.

Referring more particularly to the drawings 1 indicates the lenses having secured to their outer edges the temples 2 and connected by a mounting, preferably in the form of what is usually termed a "saddle bridge" comprising an arched or bridging portion 3 inclined to the plane of the lenses and shaped so as to conform to and rest directly upon the nose of the wearer throughout its length, its extremities 4 merging into the inner arms of forwardly opening and substantially horizontally arranged loops or pliable portions 5. The outer arms of said loops are connected at their forward ends to the lens attaching devices 6 which in this instance are each in the form of a pair of lens ears connected by an edge bearing portion 7.

It is well known that the usual saddle bridge of spectacles produces a soreness of the nose, this being due to the fact that the bridging portion in order to be inconspicuous is made of thin stock and engages the nose at a tender point. To overcome this objection I have provided rests or supports which coöperate with the bony portion of the nose below the tender portion between the eyes. These rests or supports are so connected to the mounting that the adjustment of the latter for different pupilary distances by bending the pliable loops 5 does not interfere with the position of the rests or supports with reference to each other or to the bridging portion, and at the same time the rests or supports themselves may be faced to correspond to the tapers of the different noses. In the embodiment of the invention shown in Figs. 1 to 3, each of these nose rests is in the form of a circular disk or wide bearing pad 8 arranged entirely below the bridge extremities and connected to the mounting between the pliable portions or on the inner side of the bends of the latter preferably by means of the pliable reduced portions 9. Owing to the connection of the rests to the mounting at these points the lenses may be set forward or rearward and inward or outward without interfering with the positions of the nose rests, and the latter may, by the pliable portions 9, be shifted to conform with the forward and the upward taper of the nose.

In the embodiment shown in Figs. 4, 5 and 6 the bridging portion 3, the pliable loops 5 and the lens attaching devices 6 are substantially the same parts described in the embodiment shown in Figs. 1 to 3. The pad 8ª has a slightly different shape but its mode of operation is the same owing to the provision of reduced portion 9ª. Combined with the lower rest is an upper pad or nose rest 10 which is connected to the mounting by reduced pliable portions 11 at a point directly above the pad 8ª. It is apparent that this pad coöperates with that portion of the nose between the eyes and may be adjusted independently of the lower pad to conform to the facial characteristics of the wearer.

In using the spectacles, the optician adjusts the pliable loops 5 to obtain the proper pupilary distance and the proper inset or outset to the lenses, the pads 3 previously or now being adjusted to conform to the tapers of the nose of the wearer and to take the greater portion of the weight of the mounting so that the bridging portion merely lies in loose contact with the nose. The nose rests may be formed in one piece with the mounting or may be formed separately and soldered or otherwise joined thereto. The rest adjustment, once having been obtained, is fixed and the nose is engaged throughout a large surface so that the pressure of the spectacles is distributed and soreness to the nose obviated.

I claim as my invention:

1. A mounting for spectacles comprising a rigid bridge conforming to and arranged to rest directly upon the nose of the wearer, lens attaching devices, a pliable portion connecting the lens attaching devices with the bridging portion, and nose rests arranged in fixed spaced relation having a wide portion arranged entirely below and directly beneath the horizontal plane of the extremities of the bridging portion, and having a reduced pliable portion connected to the mounting between the pliable portions so that the lens attaching devices are movable relatively to each other without affecting the relative positions of the nose rests.

2. A mounting for spectacles comprising a rigid bridge conforming to and arranged to rest directly upon the nose of the wearer, lens attaching devices, pliable loops connecting the lens attaching devices and the ends of the bridging portion, and rests arranged in fixed spaced relation having wide portions arranged entirely below the ends of the bridging portion and pliable reduced portions extending from the upper portions of the wide portions and connected to the mounting on the inner sides of the pliable loops.

3. A mounting for spectacles comprising a rigid bridge conforming to and arranged to rest directly upon the nose of a wearer, lens attaching devices, forwardly opening pliable loops each connecting one of the lens attaching devices to one of the extremities of the bridging portion in a horizontal plane with such extremities, and rests arranged in fixed spaced relation having widened portions and pliable reduced portions connected to the mounting in advance of and on the inner sides of the bends of the loops.

4. A mounting for spectacles comprising a rigid bridge conforming to and arranged to rest directly on the nose of the wearer, lens attaching devices, horizontally arranged loops having their inner arms connected to the bridging portions in a horizontal plane with the extremities of the bridging portion and their outer arms connected to the lens attaching devices, and rests arranged in fixed spaced relation having wide portions arranged entirely below the extremities of the bridging portion and pliable reduced portions each extending vertically connecting with the mounting on the inner side of the bend of one of the loops.

5. A mounting for spectacles comprising a rigid bridge, lens attaching devices, forwardly opening loops connected to the lens attaching devices and to the extremities of the bridging portion in a horizontal plane with the ends of the latter, and rests arranged in pairs in fixed spaced relation at each end of the bridging portion, one member of each being arranged above the loops and the other member being arranged below the loops and each rest having a wide bearing portion and an individual reduced portion connecting with the mounting on the inner sides of the bends of the loops.

6. In a spectacle, the combination with lenses, temples connected thereto and a rigid bridge between the lenses, of pliable loops arranged between and respectively connecting an end of the bridge with each lens and a nose rest connected to the inner arm of each loop and having an enlarged portion lying substantially directly beneath the adjacent end of the bridge, said rests having a fixed spaced relation.

LEO F. ADT.

Witnesses:
 Edward Murphy, 2d,
 Jas. B. Egan.